United States Patent [19]
Villard

[11] Patent Number: 5,541,499
[45] Date of Patent: Jul. 30, 1996

[54] ELECTRONIC TRIP DEVICE COMPRISING A POWER SUPPLY CONTROL DEVICE

[75] Inventor: Dominique Villard, Eybens, France

[73] Assignee: Merlin Gerin, France

[21] Appl. No.: 240,488

[22] Filed: May 10, 1994

[30] Foreign Application Priority Data

May 21, 1993 [FR] France .................................. 93 06279

[51] Int. Cl.[6] .................................................. G05F 1/40
[52] U.S. Cl. ........................... 323/268; 323/277; 323/284
[58] Field of Search ........................... 323/268, 274, 323/284, 277, 282, 280; 363/50

[56] References Cited

U.S. PATENT DOCUMENTS

| | | | |
|---|---|---|---|
| 3,890,537 | 6/1975 | Park et al. | 315/208 |
| 3,913,002 | 10/1975 | Steigerwald et al. | 363/18 |
| 3,983,473 | 9/1976 | Sanderson | 323/274 |
| 4,350,948 | 9/1982 | Meroni | 323/282 |
| 4,502,152 | 2/1985 | Sinclair | 323/268 |
| 4,791,350 | 12/1988 | Roof | 323/284 |
| 5,034,676 | 7/1991 | Kinzalow | 323/268 |
| 5,337,205 | 8/1994 | Haun et al. | 361/56 |

FOREIGN PATENT DOCUMENTS

| | | |
|---|---|---|
| 295342 | 12/1988 | European Pat. Off. . |
| 2027957 | 2/1980 | United Kingdom . |
| 2068607 | 8/1981 | United Kingdom . |

*Primary Examiner*—Peter S. Wong
*Assistant Examiner*—Shawn Riley
*Attorney, Agent, or Firm*—Parkhurst, Wendel & Burr

[57] ABSTRACT

The power supply control device comprises two regulating modes, linear regulation and chopping regulation. A current from a sensor, rectified by diodes, supplies a power supply circuit comprising a storage capacitor and a regulating transistor. A resistor and a control circuit measure the value of the current and select the regulating mode via a selector. If the current is lower than a preset threshold regulation is linear, the base of the transistor is connected to a Zener diode. When the current exceeds a preset threshold regulation is chopped and the base of the transistor is connected to the output of a comparator.

7 Claims, 5 Drawing Sheets

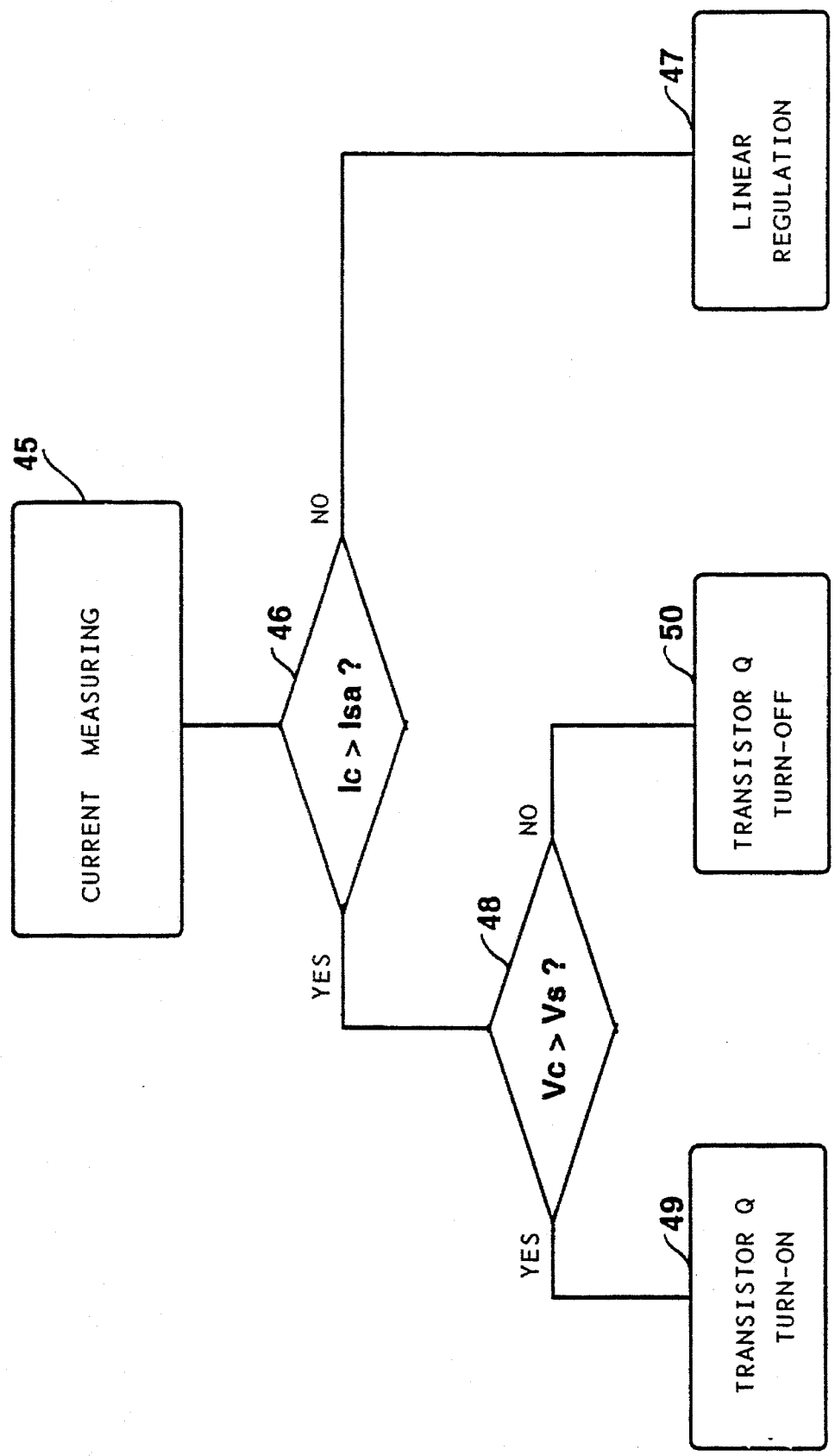

ELECTRONIC TRIP DEVICE COMPRISING A POWER SUPPLY CONTROL DEVICE

BACKGROUND OF THE INVENTION

The invention relates to an electronic trip device for a circuit breaker protecting an electrical power system comprising:

a current sensor per pole supplying a secondary current proportional to a current flowing in an associated conductor of the power system protected by the circuit breaker, an electronic processing unit receiving the signals supplied by the sensors, and delivering a tripping order, with or without a delay, when the currents flowing in the conductors to be protected exceed preset tripping thresholds, a power supply circuit supplying the electrical power to the electrical circuitry of the trip device and to a tripping relay, and comprising chopping regulation means.

State-of-the-art electronic trip devices comprise power supply circuits to supply electrical power to the electronic circuitry of the processing unit, and the energy required for operation of a tripping relay. In most trip devices, the electronic circuitry operating voltage and the tripping relay operating voltage are different. The electronic circuitry supply voltages are compatible with the operating voltages of the digital integrated circuits, about 5 V and accurately regulated. The energy required for operation of the relay must be compatible with the current delivered by the sensors and the opening voltage they can withstand without disturbing the current. This voltage is generally situated between 9 V and 25 V, and the trip device must be able to operate with a minimum current of 10 to 20 mA. As the relay operating current is greater than the minimum current supplied by the sensors, a decoupling capacitor enables the relay operating energy to be stored. The current from the sensors then charges the capacitor up to the relay operating voltage and, when a tripping order is applied to the relay, the capacitor discharges at high speed into the relay with a strong current generally greater than the current from the sensors. Regulation of this operating voltage is achieved in state-of-the-art manner by linear regulation which limits the voltage and absorbs the current from the sensors, or by chopping regulation. In chopping regulation the current from the sensors charges the storage capacitor, then, when the charging voltage exceeds a preset threshold, a regulating circuit orders turn-on of a transistor to branch the current off and stop the charging. The power supply chopping cycles, corresponding to turn-on and turn-off of the transistor, may be free or fixed with a variable duty cycle.

Linear regulation limits the operating voltage and absorbs the current from the sensors in this voltage. With this regulating mode, the power absorbed becomes very high when the current increases. Chopping regulation prevents excessive heating as the voltage present in the chopping means at the moment the current from the sensors flows is low. However, for low currents on sensor output, the voltage variations due to chopping disturb operation of the sensors and impair the shape of the current. These disturbances have an effect on the behaviour of the trip device since the currents from the sensors are used for the tripping functions.

SUMMARY OF THE INVENTION

The object of the invention is to achieve a power supply device for a trip device which limits the disturbances and prevents a large power dissipation.

According to the invention, the power supply circuit comprises means for linear regulation, means for comparing the current from at least one of the sensors with a preset regulating threshold, controlling means for selecting enabling switching from linear regulation to chopping regulation when the current from at least one of the sensors exceeds said preset threshold.

According to a particular embodiment, the power supply circuit switches from linear regulation to chopping regulation when the sum of the secondary currents from the sensors exceeds a preset threshold.

According to a development of the embodiments, the means for comparing are means for comparing with hysteresis.

According to a development of the invention, the means for comparing and the means for selecting select chopping regulation when the current from the sensors exceeds a preset threshold, and when the regulation has remained for a first preset time in linear regulation, and select linear regulation when the current from the sensors drops below a preset threshold, and when the regulation has remained for a second preset time in chopping regulation.

BRIEF DESCRIPTION OF THE DRAWINGS

Other advantages and features will become more clearly apparent from the following description of illustrative embodiments of the invention, given as non-restrictive examples only and represented in the accompanying drawings in which:

FIG. 5 represents a simplified flowchart of regulation control according to a programmed embodiment.

DETAILED DESCRIPTION OF THE PREFERRED EMBODIMENT

Figure 1:
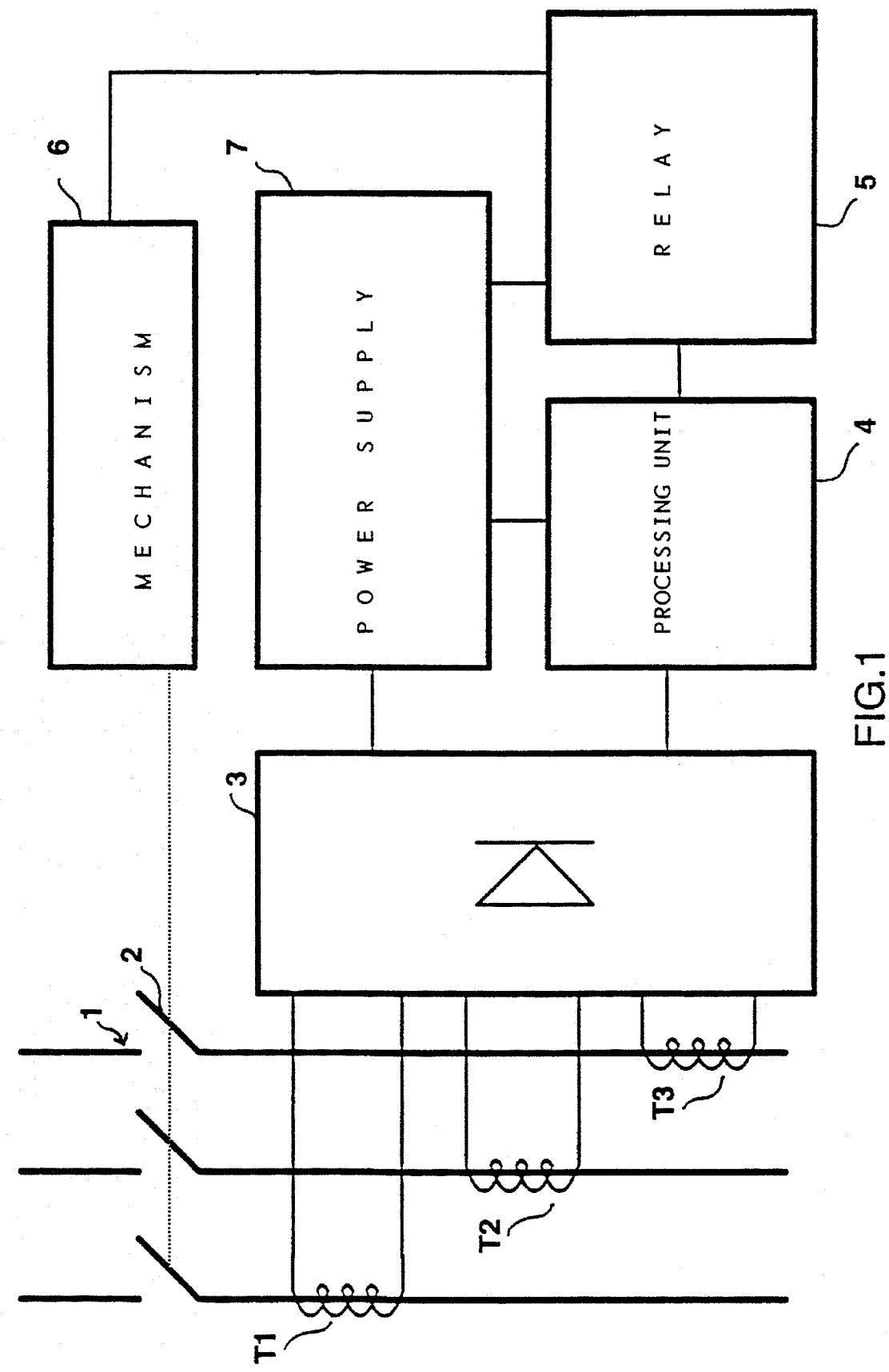
FIG. 1 represents a simplified block diagram of a circuit breaker in which a trip device comprising the invention can be implemented.

FIG. 1 represents a state-of-the-art circuit breaker. An electrical power system 1 to be protected is composed of electrical conductors connected to contacts 2 enabling the current to be established or interrupted. Current sensors T1, T2, T3 associated with the different conductors of the power system transform the primary currents of high value into secondary currents compatible with electronic trip devices. The secondary currents are applied to the input of a rectifying and detection circuit 3. This circuit supplies signals representative of the currents to an electronic processing unit 4 and a supply current to a power supply circuit 7 of the trip device. A tripping order produced by the processing unit 4 is applied to the input of a control relay 5 which actuates an opening mechanism 6 of the circuit breaker contacts 2. The power supply circuit 7 supplies the processing unit 4 with a regulated voltage of about 5 V, and supplies a voltage of higher value for control of the relay 5.

Figure 2:
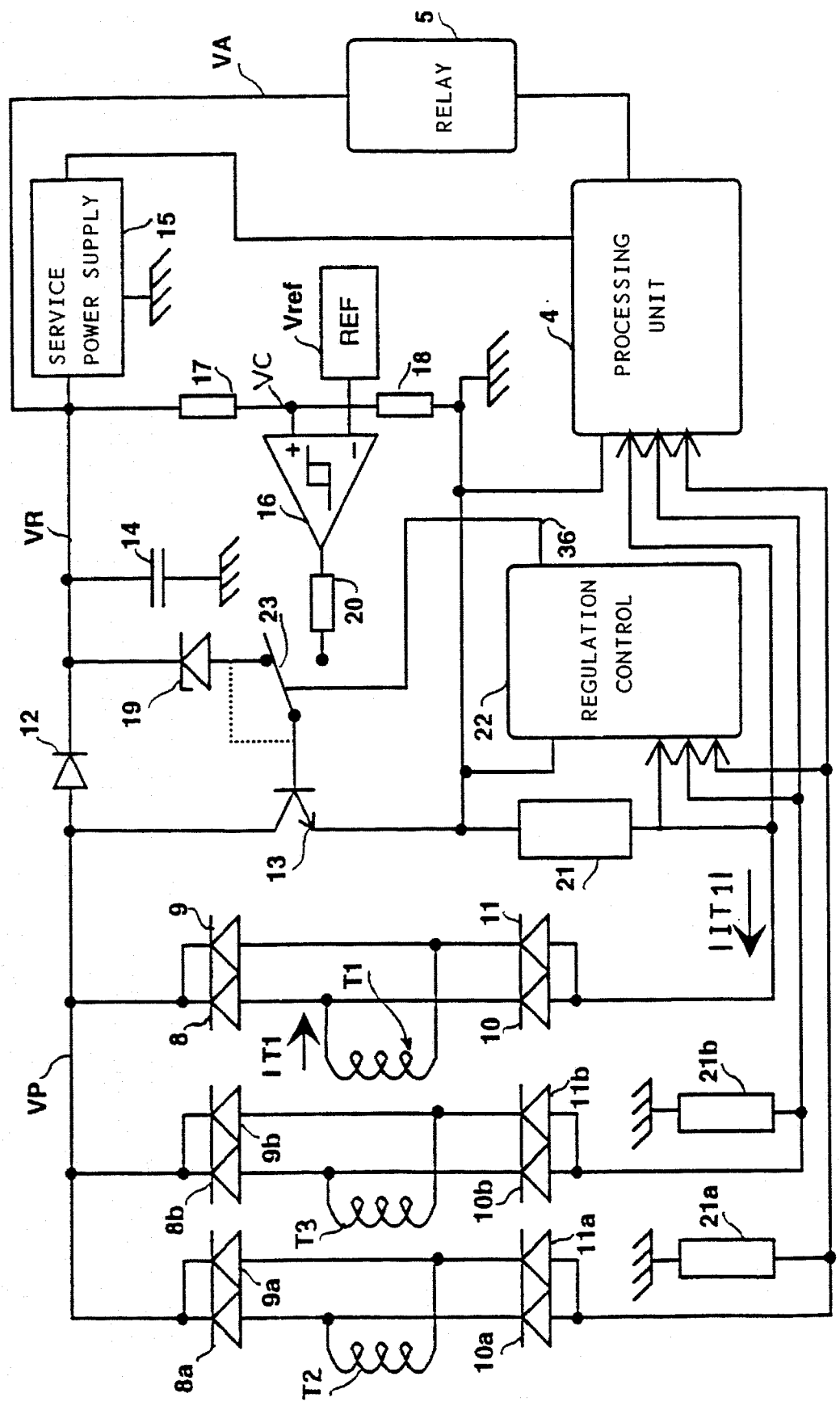
FIG. 2 represents a diagram of a trip device according to an embodiment of the invention.

The diagram of a trip device according to a particular embodiment of the invention is represented in FIG. 2. The secondary winding of the current sensor T1 is connected to a rectifier bridge formed by a group of four diodes 8 to 11.

A first end of the secondary winding is connected to the anode of a first diode 8 and to the cathode of a second diode 10, whereas a second end of the secondary winding is connected to the anode of a third diode 9 and to the cathode of a fourth diode 11. The cathodes of the first and third diodes 8 and 9 are connected to a positive power supply line VP. The anodes of the second and fourth diodes 10 and 11 are connected to a first terminal of a measuring resistor 21. The other terminal of the measuring resistor is connected to an electrical ground of the trip device. The other sensors T2 and T3 are connected in the same way to two rectifier bridges, represented respectively by diodes 8*a*, 9*a*, 10*a*, 11*a* and 8*b*, 9*b*, 10*a,b* and 11*b*. The cathodes of the diodes 8*a,b* and 9*a,b* are connected to the line VP. Two measuring resistors R21*a* and R21*b* are connected respectively between the anodes of the diodes 10*a* and 11*a* and ground, and between the anodes of the diodes 10*b* and 11*b* and ground.

A regulating transistor 13 has its collector connected to the positive line VP, and its emitter grounded, and receives regulating orders on its base. A diode 12, connected by its anode to the line VP and by its cathode to a line VR, enables a storage capacitor 14 connected between the line VR and ground to be charged. A regulation selector 23, connected to the base of the transistor 13, enables switching from a linear regulation to a chopping regulation. Control of the selector 23 is performed by a regulation control circuit 22, connected in parallel to the current from the sensors measuring resistors 21, 21*a* and 21*b*. Linear regulation is achieved by means of a zener diode 19 connected by its cathode to the line VR and by its anode to a first input of the regulation selector 23. Chopping regulation is achieved by means of a comparator 16 able to comprise a hysteresis cycle. The output of the comparator 16 is connected to a second input of the selector 23 by means of a resistor 20. A first input of the comparator 16 receives a reference voltage Vref, and a second input receives a value representative of the voltage of the line VR. In FIG. 2, the value VC representative of the voltage of the line VR is obtained at the point common to two resistors 17 and 18 connected in series between the line VR and ground.

The processing unit 4 receives on input values representative of the currents measured on the resistors 21, 21*a* and 21*b*, and supplies a tripping order to the relay 5 when the currents exceed preset thresholds for a preset time. The relay 5 is supplied directly by the voltage VR which may be about 9 to 25 V. A regulating circuit 15 supplies a service voltage, of about 5 V, for operation of the electronic circuitry of the trip device, notably of the processing unit 4.

When a positive current IT1 is generated in the secondary of the sensor T1, it flows via the diode 8. Then on the line VP a part of the current flows via the diode 12 to supply the trip device and another part flows via the transistor 13. On the ground line all the currents are recovered and the current IT1 flows through the measuring resistor 21 to return to the sensor T1 via the diode 11. Linear regulation is performed by the transistor 13 and zener diode 19 which constitute a voltage limiter when the base of 13 is connected to the diode 19. So long as the voltage between the line VR and ground is lower than the reverse turn-on voltage of the zener diode 19, the current IT1 charges the capacitor 14. As soon as the zener diode 19 begins turning on, the transistor is turned on, a part of the current IT1 flows via the transistor 13 and the voltage VR is limited to a value appreciably equal to the value of the zener diode turn-on voltage. The voltage VP between the collector and emitter of the transistor 13 is slightly greater than the voltage VR, and the power dissipated by the transistor can be very high if the current increases.

Chopping regulation is achieved by the comparator 16, resistors 17, 18, 20 and transistor 13, when the selector 23 connects the base of the transistor to the output of the comparator 16. If the voltage VC representative of VR is lower than the value supplied by the reference voltage Vref, the comparator output is in a low state and the transistor is off. The current IT1 flows via the diode 12 and charges the capacitor 14. The voltages VR and VC increase until the voltage VC exceeds the reference voltage Vref. The comparator output then switches to high state and turns the transistor on. The voltage VP then drops from a high voltage value to an almost zero voltage, all the current IT1 flows via the transistor 13 and the capacitor discharges slowly into the circuit 15 to supply the processing circuit 4. As soon as the voltage VC drops below the reference value, the transistor is turned off and the cycle begins again.

According to this embodiment the circuit 22 positions the selector 23 according to the current flowing in the resistor 21. When the current is lower than a preset threshold, the circuit 22 commands, via a line 36, setting of the selector 23 to the linear regulation position, the base of the transistor 13 being connected to the zener diode 19. If the current exceeds the preset threshold, the circuit 22 switches the selector 23 to the chopping regulation position, the base of the transistor 13 being connected to the output of the comparator 16, so as to limit the power dissipated by the transistor 13.

In this embodiment, if the voltage VP when linear regulation is performed is greater than the voltage VP when chopping regulation is performed, the zener diode 19 can remain permanently connected to the base of the transistor 13 without this disturbing operation of the chopping regulation.

Figure 3:
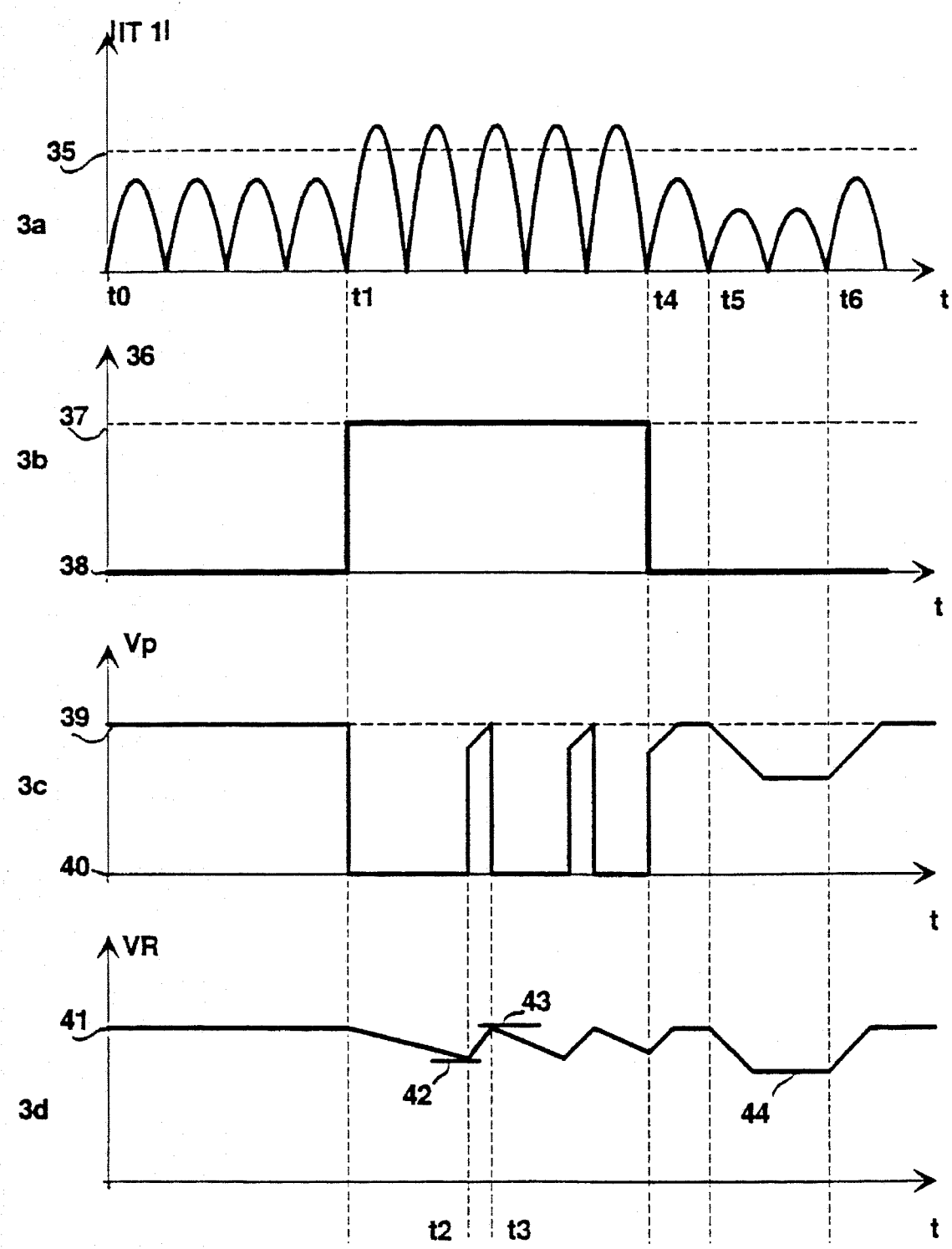
FIG. 3 illustrates on curves 3a to 3d various current and voltage signals in a trip device according to FIG. 2.

FIG. 3 represents the current and voltage signals of a trip device according to the embodiment of FIG. 2. Curve 3*a* shows a rectified current |IT1| representative of the current supplied by the sensor T1. Curve 3*b* illustrates the value of the selection signal supplied on the line 36 by the control circuit 22. The voltage VP at the collector of the transistor 13, and the voltage VR at the terminals of the capacitor 14 are represented respectively on curves 3*c* and 3*d*.

Between the times t0 and t1 the current |IT1| is lower than a preset threshold 35. The signal 36 then takes a first value 38 representative of setting of the selector to a position corresponding to linear regulation, and the voltages VP and VR have values respectively 39 and 41, appreciably equal to that of the zener diode 19.

Between the times t1 and t4 the current value is greater than the threshold 35. In this embodiment, comparison of the current with the threshold 35 can be performed either in peak value, in rms value or in mean value. The signal 36 then switches to a second value 37 representative of setting of the selector to the position corresponding to chopping regulation, and the voltage VP at the terminals of the transistor 13 is chopped. It oscillates between a high value appreciably equal to the charging voltage VR of the capacitor 14 and an appreciably nil value 40. The voltage VR can vary according to the hysteresis factor of the comparator 16 between a minimum value 42 and a maximum value 43. Between the times t1 and t2, the transistor 13 is turned on and the voltage VR decreases to the minimum value 42. Then, between the times t2 and t3, the transistor 13 is turned off, the current charges the capacitor 14 and the voltage VR increases to the maximum value 43.

At the time t4, the current IT1 drops back below the threshold 35, the signal 36 takes the value 38 corresponding to linear regulation, and the voltages VP and VR become stable again.

If as between the times t5 and t6 the current IT1 decreases considerably, the voltages VP and VR also decrease to a value 44 lower than the limiting levels 39 or 41.

Figure 4:
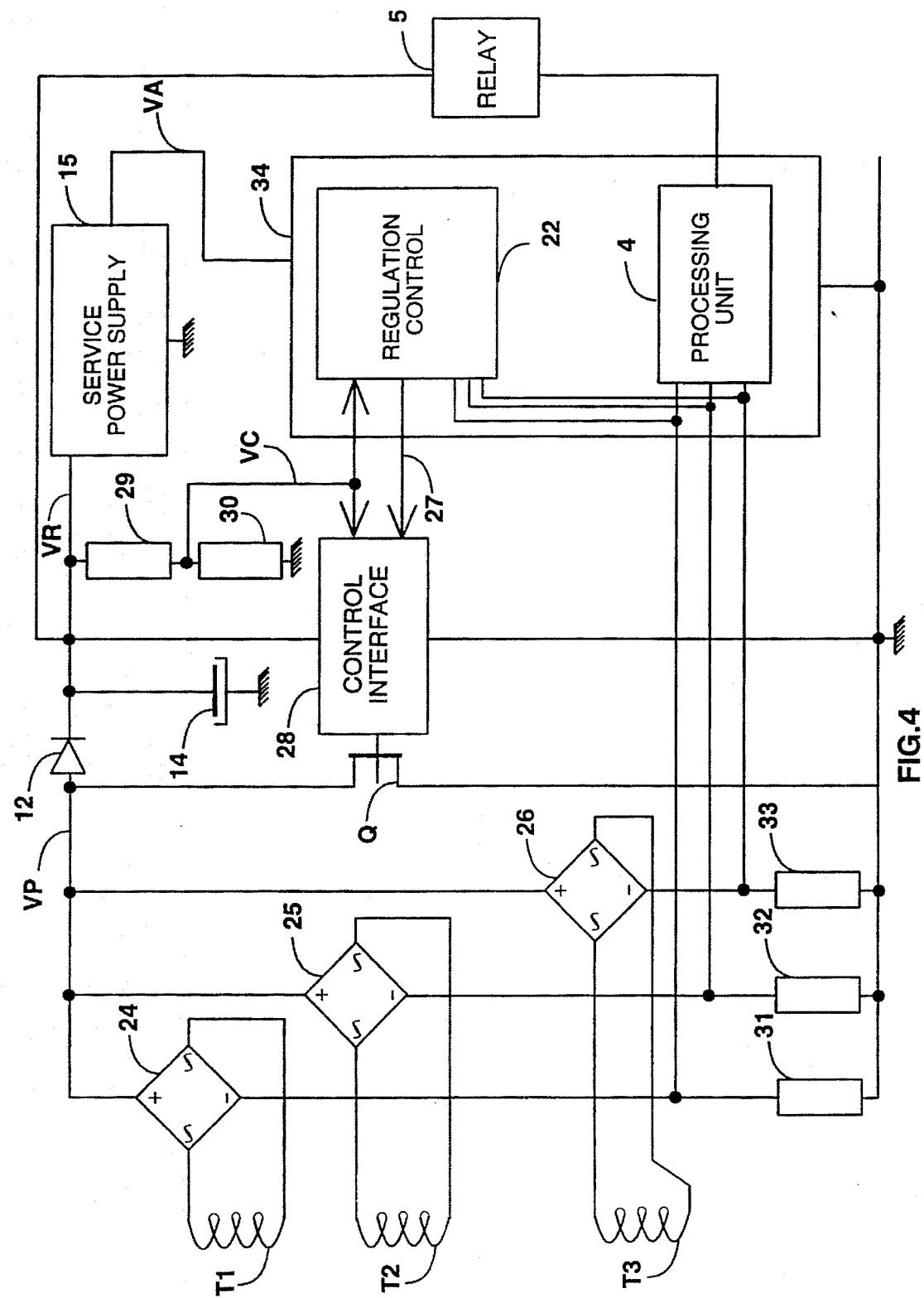
FIG. 4 represents a diagram of another embodiment of the invention.

FIG. 4 illustrates another embodiment. The three secondary windings of three sensors T1, T2 and T3 are connected to AC inputs of three rectifiers, respectively 24, 25 and 26. The positive outputs of these bridges are connected to the line VP and their negative out, puts are connected to first ends of three measuring resistors respectively 31, 32, and 33. The other ends of the resistors are connected to a ground of the trip device. A transistor Q is connected by its drain to the line VP, its source is Grounded, and its gate is controlled by a control interface circuit 28. The diode 12 connected between the line VP and the line VR conducts the charging current of the storage capacitor 14 and the supply current of the trip device. Measurement of the currents from the sensors is performed on the measuring resistors 31, 32, and 33. The current values are supplied to a circuit 34 comprising a processing unit 4 and a regulation control circuit 22. As in FIG. 2, the regulation circuit 15 supplies the service supply voltage VA for operation of the electronic circuitry of the trip device. The voltage VR is applied directly to the relay 5 which is controlled by a tripping order from the unit 4.

The interface circuit 28 checks control of the transistor Q for linear regulation or chopping regulation. A resistor bridge 29 and 30, connected in series between the line VR and ground, supplies the voltage VC representative of the voltage VR to be regulated. This voltage is applied to the interface circuit 28 and to the regulation control circuit 22. In this embodiment some of the components performing linear regulation can be integrated in the interface circuit 28, and some of the chopping regulation means can form part of the regulation control unit 22 in programmed form. The unit 22, receiving the current from the sensors values, determines whether at least one of the current values exceeds a preset threshold, and indicates to the interface circuit via the line 27 whether the regulation is linear or chopped. The value of the voltage VC, representative of the voltage to be regulated VR, is compared in the unit 22 to a regulation threshold. During chopping regulation, if the voltage is lower than the regulation threshold, the unit 22 orders opening of the transistor Q via the line 27 and interface circuit 28. When the voltage Vc becomes greater than the regulation threshold, a closing order of the transistor Q is produced by the unit 22.

A regulation flowchart, processed by the unit 22, is represented in FIG. 5. The currents from the sensors are measured in a stage 45. A comparison between a value Ic representative of the measured currents, for example the value corresponding to the maximum current in the sensors, and a preset threshold ISA, is performed by a stage 46. If the value Ic is lower than the threshold ISA, the unit 22 sets the interface circuit 28 to linear regulation at stage 47. When the value of Ic is greater than the threshold ISA, a stage 48 checks the voltage VR to be regulated. If the value Vc, representative of the voltage VR, is greater than a voltage regulation threshold Vs, the unit 22 orders turn-on of the transistor Q in stage 49. In the opposite case, the unit 22 orders turn-off of the transistor Q in stage 50.

For greater safety when switching from one operating state to another, the preset current threshold (ISA) and voltage threshold (VS) can have a hysteresis cycle. The thresholds then have different values if the values of Ic or Vc, before comparison, are greater or lower than the thresholds.

In the embodiments described above, the current value taken into account to be compared with a preset threshold is the current value from a sensor IT1 or a value Ic representative of the currents from the three sensors. This value Ic may correspond to the maximum current from the sensors value, to the sum of the currents from the sensors or to any other combination of currents, for example, if at least the currents from two sensors exceed a preset threshold.

For greater operating stability, regulation can remain in a linear or chopping mode for a preset minimum time before being able to change regulation mode. The means for performing regulation may be analog components either independent or grouped in an integrated circuit. But in trip devices with digital circuits comprising microprocessors, regulation control and regulating transistor control processing can be integrated in the processing unit program.

I claim:

1. An electronic trip device for a circuit breaker for protecting an electrical power system, said electronic trip device comprising:

at least one current sensor for supplying a secondary current signal that is proportional to a current flowing in an associated conductor of the power system protected by the circuit breaker;

an electronic processing unit for receiving the secondary current signal from the current sensor and delivering a tripping order to a tripping relay of the electronic trip device, with or without delay, when the secondary current signal is indicative of the current flowing in the associated conductor being in excess of a preset tripping threshold; and a power supply circuit connected to said current sensor that supplies power to said electronic processing unit and said tripping relay, said power supply circuit including a chopping regulation circuit, a linear regulation circuit, comparison means for comparing the secondary current supplied from said current sensor with a preset regulating threshold, and control selection means for switching regulation operation of said power supply circuit from said linear regulation circuit to said chopping regulation circuit when the secondary current exceeds said preset regulation threshold.

2. The trip device according to claim 1, wherein said electronic trip device includes at least two current sensors and wherein the power supply circuit switches from linear regulation to chopping regulation when the sum of the secondary currents from the current sensors exceeds said preset regulation threshold.

3. The trip device according to claim 1, wherein the means for comparing are means for comparing with hysteresis.

4. The trip device according to claim 1, wherein said control selection means switches regulation operation of said power supply circuit to said chopping regulation circuit when the regulation operation of said power supply circuit has remained for a first preset time in linear regulation, and switches regulation operation of said power supply circuit to said linear regulation circuit when the regulation operation of said power supply circuit has remained for a second preset time in chopping regulation.

5. The trip device according to claim 1, wherein the power supply circuit includes an electrical energy storage device that is charged from the secondary current supplied by said current sensor, and wherein energy stored in said energy storage device is used to power said tripping relay.

6. The trip device according to claim 5, wherein the power supply circuit supplies power at a D.C. first voltage level to said electronic processing unit and power at a second D.C. voltage level to said tripping relay.

7. The trip device according to claim 6, wherein the second voltage level is higher than the first voltage level.

* * * * *